US012611061B2

(12) United States Patent
Blundy et al.

(10) Patent No.: US 12,611,061 B2
(45) Date of Patent: Apr. 28, 2026

(54) INJECTION MOLDED CUTLERY AND METHOD AND SYSTEM THEREFOR

(71) Applicant: DART CONTAINER CORPORATION, Mason, MI (US)

(72) Inventors: Daniel A. Blundy, Webberville, MI (US); Gregory A. Warner, Tecumseh, MI (US); Marcus Jeffery Norman, Jonesville, MI (US); Kyle Coutchie, Portland, MI (US)

(73) Assignee: Dart Container Corporation, Mason, MI (US)

( * ) Notice: Subject to any disclaimer, the term of this patent is extended or adjusted under 35 U.S.C. 154(b) by 40 days.

(21) Appl. No.: 18/417,371

(22) Filed: Jan. 19, 2024

(65) Prior Publication Data

US 2024/0324803 A1 Oct. 3, 2024

Related U.S. Application Data

(60) Provisional application No. 63/455,708, filed on Mar. 30, 2023.

(51) Int. Cl.
| | |
|---|---|
| *A47G 21/02* | (2006.01) |
| *A47G 21/04* | (2006.01) |
| *B26B 3/02* | (2006.01) |
| *B29C 45/26* | (2006.01) |
| *B29C 45/34* | (2006.01) |
| *B29K 67/00* | (2006.01) |

(Continued)

(52) U.S. Cl.
CPC ............ *A47G 21/023* (2013.01); *A47G 21/04* (2013.01); *A47G 2400/10* (2013.01); *B26B 3/02* (2013.01); *B29C 2045/2683* (2013.01);

*B29C 45/34* (2013.01); *B29K 2067/00* (2013.01); *B29K 2105/0094* (2013.01); *B29K 2995/006* (2013.01); *B29L 2031/286* (2013.01)

(58) Field of Classification Search
CPC .. A47G 21/023; A47G 21/04; A47G 2400/10; B26B 3/02; B29C 45/34; B29C 2045/2683; B29K 2105/0094; B29K 2067/00; B29K 2995/006; B29L 2031/286
See application file for complete search history.

(56) References Cited

U.S. PATENT DOCUMENTS

| | | | |
|---|---|---|---|
| 5,667,745 A | 9/1997 | Andersson |
| 2009/0200315 A1 | 8/2009 | Blondeel |

FOREIGN PATENT DOCUMENTS

| | | | | |
|---|---|---|---|---|
| CN | 206383405 U | * | 8/2017 |
| CN | 106827405 B | | 12/2018 |

(Continued)

OTHER PUBLICATIONS

Liu translation accessed on ESpaceNet Oct. 16, 2025 (Year: 2017).*

(Continued)

*Primary Examiner* — Jamel M Nelson
*Assistant Examiner* — Erica Hartsell Funk
(74) *Attorney, Agent, or Firm* — McGarry Bair PC

(57) ABSTRACT

Aspects of the present disclosure relate to injection molded cutlery having a body defining a handle portion and a utensil portion, with an injection gate mark located at a center section of the body. The body can be made from a bio-material injected at a pressure that is less than 60% of an injection pressure required for injection at an end of the body.

11 Claims, 9 Drawing Sheets

(51) Int. Cl.
    *B29K 105/00*       (2006.01)
    *B29L 31/28*       (2006.01)

(56)             References Cited

FOREIGN PATENT DOCUMENTS

| | | | |
|---|---|---|---|
| GB | 2557380 | B | 12/2018 |
| GB | 2531603 | B | 11/2020 |
| JP | 4694046 | B2 | 6/2011 |

OTHER PUBLICATIONS

China Plastic Cutlery Mould Maker, Topworks Plastic Mold, Mold City, Huangyan, CN 318020, Available at https://www.myplasticmold.com/plastic-cutlery-mould-maker, Accessed Mar. 28, 2023, 8 Pages.

* cited by examiner

INJECTION MOLDED CUTLERY AND METHOD AND SYSTEM THEREFOR

CROSS-REFERENCE TO RELATED APPLICATIONS

This application claims priority to and the benefit of U.S. Provisional Patent Application No. 63/455,708 filed Mar. 30, 2023, which is incorporated herein by reference.

BACKGROUND

Plastic cutlery or utensils, such as forks, knives, and spoons, are widely used, and typically made by injection molding, which is based on a mold set defining multiple cavities in the shape of the utensil being made. The molten plastic is injected into each of the cavities, typically at an end portion of the cavity forming a handle for the utensil, at an injection pressure to ensure the plastic will flow from the one end of the cavity to the other to fill the cavity.

Injection molding machines generally include an injector, platen, and press. The platen generally has a fixed platen coupled to the injector and supports a first part of the mold, and a moveable platen driven by the press toward the fixed platen and supporting a second part of the mold, where the first and second mold parts come together to form the cavity. The press applies a counter force to the injection pressure from the injector to keep the mold parts closed.

The injection molding machines come in standard sizes, which are normally rated based on the pressure generated by the press, with the sizing being categorized in terms of "tons of pressure" or "tonnage", for example, a "5 ton machine". The platens tend to be of a fixed size and can only accommodate a mold or multiple molds of a certain physical size. The number of utensils that can be formed in a single cycle of operation of the injection molding machine is a function of the needed injection pressure, the tonnage rating of the press, and the area on the platen.

SUMMARY

According to one aspect, an injection molded cutlery has a body defining a handle portion and a utensil portion, with an injection gate mark located at a center section of the body. The body can be made from a bio-material injected at a pressure that is less than 60% of an injection pressure required for injection at an end of the body.

In another aspect, a method of injection molding a plastic cutlery in a mold having at least two mold portions forming a utensil-shaped mold cavity can comprise injecting a molten biodegradable plastic into a center section of the utensil-shaped mold cavity at an injection pressure that is less than 60% of an injection pressure required for injection at an end of the body In another aspect a system for forming injection molded cutlery from a bio-material comprises a mold including a plurality of utensil-shaped mold cavities each having a center section corresponding to the center section of a body of the utensil; a plurality of gates in fluid communication with the center sections of the mold cavities; an injector assembly coupled to the mold to provide the bio-material to the plurality of utensil-shaped cavities via the plurality of gates; and a press operably coupled with the mold.

DETAILED DESCRIPTION

Injection molding machines rely on a press to applying a clamping force (tons or tonnage) to hold the mold parts together against the injection pressure of the molten plastic. The injection pressure is provided by an extruder that feeds the molten plastic to the mold. The platens of the injection molding machine are normally sized to accommodate different size molds and/or multiple molds. The size and/or number of molds are limited by the area of the platen, the injection pressure required by the plastic for the given mold, and the tonnage of the injection molding machine. The clamping force of the injection molding machine has to be greater than the injection pressure as applied to the one or more molds. As injection pressure increases, the number of mold cavities will decrease, all other things being equal.

The injection molding of plastic cutlery historically used polypropylene or polystyrene as the plastic, which was injected at the end of the handle and flowed to the tip of the cutlery. Polypropylene and polystyrene are not considered biodegradable plastics. When switching to biodegradable plastics, which have a much higher viscosity, it was found that the injection pressure was almost double that required for the non-biodegradable plastics. All things being equal, the doubling of the injection pressure when using biodegradable plastics would result in an inverse reduction in the number of pieces of cutlery that could be molded in a single cycle of the injection molding machine compared to when the machine was used with non-biodegradable plastics. To achieve the non-biodegradable production rates, it would be necessary to invest in new, greater tonnage injection molding machines (not desirable), or somehow reduce the injection pressure. It would also be desirable to maintain the same injection time to maintain the same production rates.

It was discovered that, when using biodegradable plastics, by moving the injection location from the end of the handle to approximately the volumetric center of the cutlery, the injection pressure was reduced to an injection pressure similar to that for the polypropylene when injected at the end of the handle for an otherwise identical cutlery cavity. The volumetric center injection point also enabled similar injection times. Suitable injection times are typically around 1 second. With the same injection pressure and same injection time for the injection location at the volumetric center, cutlery made from biodegradable plastic could be made at the same rate in the same injection molding machines, eliminating the need to invest in more robust injection molding machines.

Figure 1:
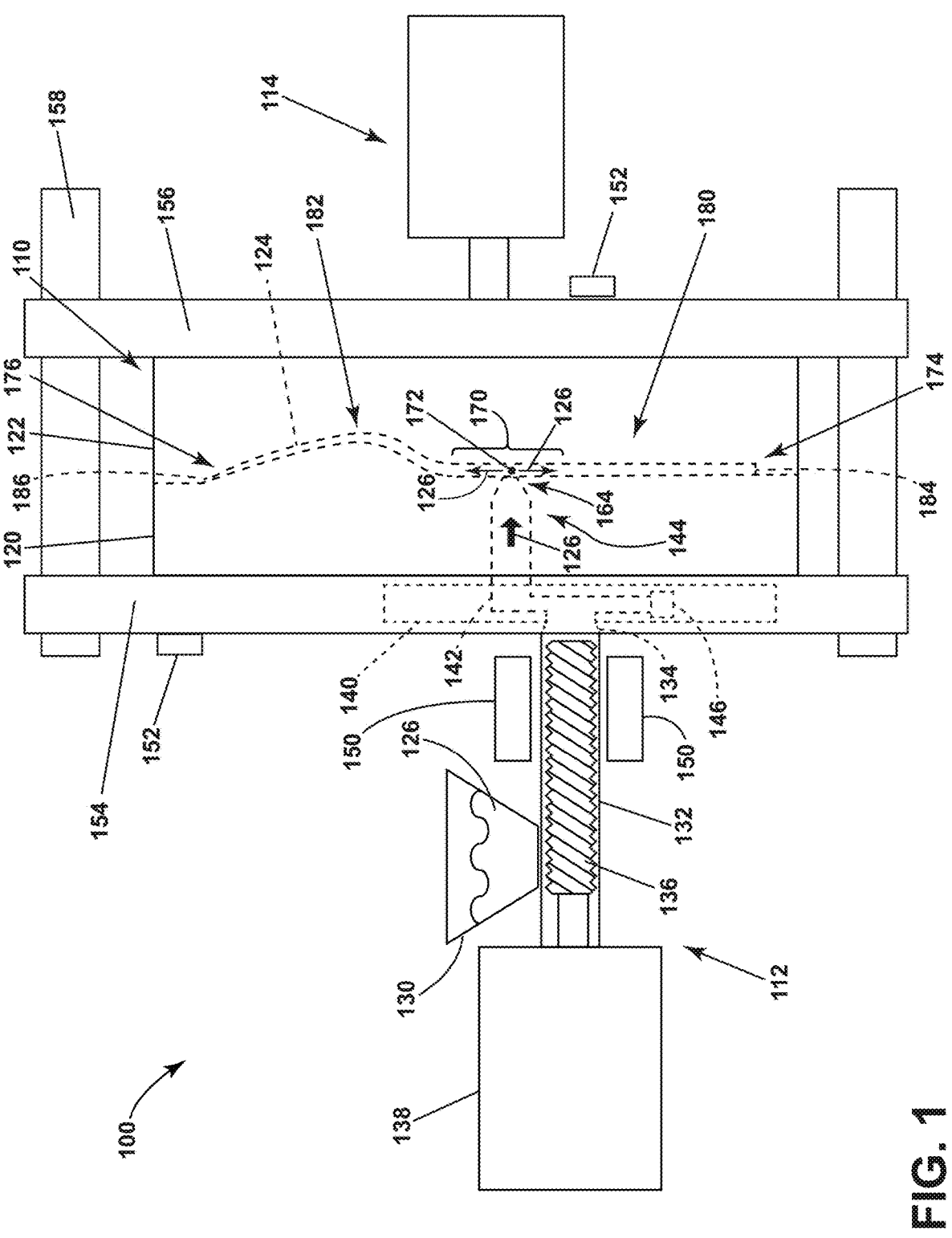
FIG. 1 is a schematic view of an exemplary system for injection molding cutlery according to an aspect of the disclosure.

FIG. 1 illustrates an exemplary system 100 for injection molding cutlery. The system 100 can include a mold 110, an injector assembly 112, and/or a press 114. The mold 110 can include a first mold portion 120 and a second mold portion 122 that can provide one or more cavities 124. The one or more cavities 124 can be cutlery-shaped. The injector assembly 112 can inject material 126 into the one or more cavities 124 to form cutlery 200 (see, e.g., FIGS. 7-9). The press 114 can apply a clamping force to one or both of the mold portions 120, 122 to clamp the mold portions 120, 122 together, such as during injection of material 126 into the one or more cavities 124. The cavities 124 are shown in the shape of a fork and are exaggerated in size for case of understanding. The cavities can be in the shape of any cutlery and in actual use will be smaller relative to the injector assembly 112 and press 114.

The injector assembly 112 can include a hopper 130, a barrel 132, a nozzle 134, a screw 136, and/or a screw actuator 138. The hopper 130 can store the raw material 126, usually in pellet form, and provide the pellets to the barrel 132, such as via a gravity feed. The screw 136 can be disposed in the barrel 132 to push the plastic 126 that has entered the barrel 132 from the hopper 130 toward the nozzle 134. The barrel 132 can be heated such that the combination of the heat and the pressure from the screw 136 converts the solid pellets to molten plastic. The screw actuator 138 can be operably coupled to drive the screw 136 in the barrel 132. For example, the screw actuator 138 may comprise a motor to rotate the screw 136 and/or may comprise a linear actuator (e.g., a cylinder, ram, press, etc.) to cause linear/axial movement of the screw 136.

Turning the screw 136 and/or pushing the molten plastic 126 toward the nozzle 134 can increase the pressure of the molten plastic 126 provided to a manifold 140 and/or injected into the cavity 124. The injector assembly 112 can, in some configurations, provide injection pressures of up to 20,000 PSI or more. Higher injection pressures can decrease cavity fill times, but can also increase corresponding clamping forces required from the press 114 to keep the mold portions 120, 122 clamped together during injection. The press 114 will have a maximum clamp force, and the required clamp force may be a function of the number of cavities 124 and the injection pressure. Increasing the number of cavities 124 or increasing injection pressure can increase the required clamping force. Accordingly, reducing injection pressure can increase the number of cavities 124 of a mold 110 of a particular size, which can increase molding efficiency (i.e., cutlery piece/utensil per area of production floor space per unit of time).

The injector assembly 112 can include one or more heaters 150 that heat, melt and/or maintain the molten plastic 126 in a temperature range. The one or more heaters 150 can be disposed on, in, and/or adjacent to one or more portions of the injector assembly 112, such as the hopper 130 and/or the barrel 132. For some biodegradable plastics, the temperature range may be approximately 330 to 360 degrees Fahrenheit, and/or can be a function of the melt point of the material. The temperature range may or may not be the same for different portions of the injector assembly 112. For example, in some configurations, a temperature range of molten plastic 126 in the barrel 132 may be higher than molten plastic 126 in the hopper 130, and in other configurations the temperature ranges may be substantially the same.

According to an aspect of the present disclosure, a system 100 can include an injector assembly 112 for each mold 100 or group of cavities 124, or an injector assembly 112 for each press 114. For example, an injector assembly 112 can include a manifold 140 (i.e., a heated manifold) that distributes molten plastic 126 from the barrel 132 and nozzle 134 through one or more internal passages 142 of the manifold 140 to a plurality of manifold nozzles 144, 146 that are each connected to a respective cavity 124 of one or more molds 100. A manifold nozzle 146 is shown in FIG. 1 as a box for illustration purposes, since only one cavity 124 is shown, but manifold nozzles 146 are coupled to respective other cavities 124 and can have the same or similar configurations as illustrated manifold nozzle 144 (see, e.g., FIG. 11). The injector assemblies 112 may be standalone assemblies or may share one or more components. For example, multiple injector assemblies 112 can share a common hopper 130.

With further reference to FIG. 1, a cavity 124 can be cutlery-shaped. Fork-shaped cavities are shown for illustrative purposes in the drawings, but the disclosure is not limited to fork-shaped cavities or injection molding forks-aspects of the instant disclosure can be applied to other cutlery or utensils, such a spoons and knives, among others. The first mold portion 120 and the second mold portion 122 can cooperate to define the cavity 124. For example, the first mold portion 120 and the second mold portion 122 can each include parts (e.g., walls, surfaces, etc.) of the cavity 124.

The mold 110 can include one or more heaters 152 that maintain the molten plastic 126 in the cavity 124 in a temperature range. The one or more heaters 152 can be disposed on, in, and/or adjacent to one or more portions of the mold 110. In some instances, the temperature range can be approximately 130 to 160 degrees Fahrenheit.

According to an aspect of the present disclosure, one or both of the first mold portion 120 and the second mold portion 122 can be movable toward the other. In one exemplary configuration, the first mold portion 120 can be fixed, such as via a fixed platen 154, and the second mold portion 122 can be operably coupled to the press 114, such as via a movable platen 156. The platens 154, 156 can be operably coupled by rails 158. The press 114 can move the movable platen 156 and the second mold portion 122 toward the first mold portion 120 and can apply a clamping force to the mold portions 120, 122, such as to keep the mold portions 120, 122 together during injection of pressurized molten plastic 126 via the injector assembly 112. The press 114 can include a press, a ram, and/or a hydraulic cylinder, among other configurations.

According to an aspect of the present disclosure, portions of the manifold nozzles 144, 146 can be disposed in one of the mold portions 120, 122, which can include a corresponding void 160 for receiving such portions of the nozzles 144, 146. The void 160 may include a first opening 162 at an outer side of the mold portion 120, 122 and a second opening 164 at the cavity 124. The second opening 164 may also be referred to as a gate 164. The size (e.g., area, diameter, etc.) of the gate 164 may dictate, at least in part, the pressure and/or flow rate of molten plastic 126 into the cavity 124. With some aspects, the gate 164 can be configured as a valve gate.

Figure 2:
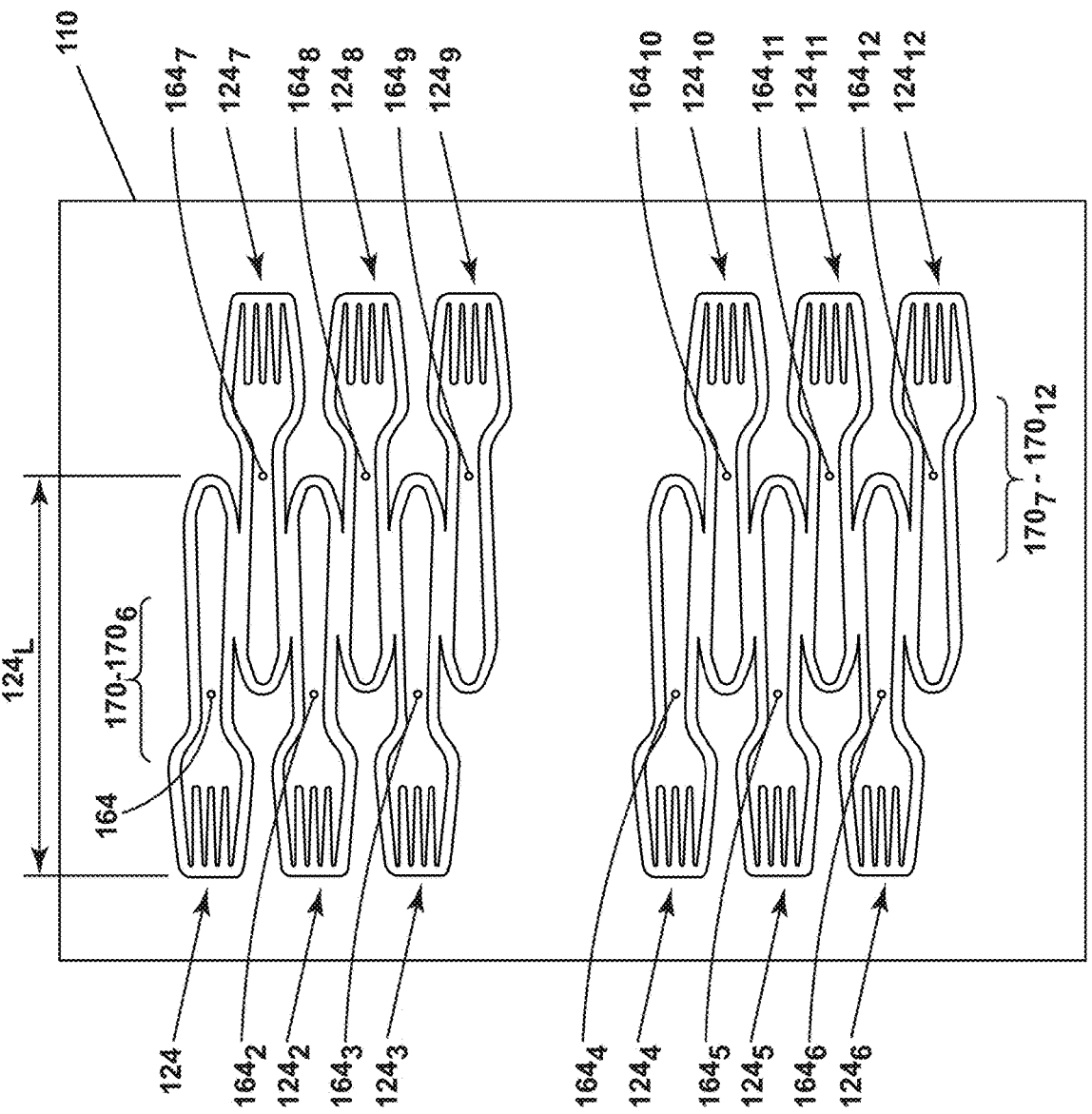
FIG. 2 is a cross-sectional view of an exemplary mold portion for injection molding cutlery according to an aspect of the disclosure.

According to an aspect of the present disclosure, as generally illustrated in FIGS. 1 and 2, the gate 164 is located at a center section 170 of the cavity 124 and/or not proximate an end of the cavity 124. The center section 170 can comprise 20% or less (e.g., 15% or less, 10% or less, 5% or less, among others) of the total volume of the cavity 124 centered at the volumetric center 172 of the cavity 124. A total volume of the cavity 124 and/or of cutlery 200 formed via the cavity 124 can, for example and without limitation, be about 0.22 in$^3$ to about 0.25 in$^3$ in some configurations. Locating the gate 164 at the center section 170 can enable reduced injection pressures, such as for higher viscosity materials, while maintaining and/or limiting increases in fill times. Reduced injection pressures can also enable an increase in the number of mold cavities 124 per mold 110 and/or reduce a clamping force needed from the press 114.

According to an aspect of the present disclosure, a mold 110 (or mold 110') can include a first cavity 124 and one or a plurality of additional cavities. For example, as generally illustrated in connection with the first mold portion 120 shown in FIG. 2, a mold 110 (or mold 110') can include additional cavities 124$_2$-124$_{12}$ that can each have an associated additional gate (e.g., gates 164$_2$-164$_{12}$). A second mold portion 122 can cooperate with the first mold portion 120 to fully define the cavity 124 and/or the one or a plurality of additional cavities 124$_2$-124$_{12}$. In some configurations, a plurality of additional cavities can include a first set of additional cavities 124$_{2-6}$ and a second set of additional cavities 124$_{7-12}$. The first set of additional cavities 124$_{2-6}$ can be parallel with each other and/or the first cavity 124. The second set of additional cavities 124$_{7-12}$ can be parallel with each other, antiparallel with the first cavity 124, and/or disposed in an alternating pattern with the first cavity 124 and the set of additional cavities 124$_{2-6}$. The plurality of additional gates 164$_2$-164$_{12}$ can be located at respective center sections 170$_{2-12}$ of the plurality of additional cavities 124$_2$-124$_{12}$.

While twelve total cavities 124 are shown, a mold 110 is not limited to twelve cavities 124 and can include other numbers of cavities 124. The total number of cavities 124 of all molds 110, 110' coupled to a press 114, along with injection pressure, may be defined according to a maximum clamping force that can be provided by the press 114 and/or dictate, at least in part, a minimum clamping force required from the press 114. Some configurations can include at least 48 total cavities 124.

According to an aspect of the present disclosure, a cavity 124 can include a handle section 180 and a utensil section 182. The handle section 180 can be adapted to form a handle portion 204 of cutlery 200. The utensil section 182 can be adapted for form a utensil portion 206 of cutlery 200. For example, the utensil section 182 can include a plurality of tine-shaped portions if the cutlery 200 is a fork, the utensil section 182 can include a blade-shaped portion if cutlery 200 is a knife, the utensil section 182 can include a bowl-shaped portion if cutlery 200 is a spoon, and/or the utensil section 182 can include other configurations for other cutlery or utensils. The center section 170 can include parts of either or both of the handle section 180 and the utensil section 182.

According to an aspect of the present disclosure, a cavity 124 can include a plurality of vents, such as a first vent 184 and/or one or more second vents 186. The first vent 184 can be disposed at a first end 174 of the cavity 124, and/or the one or more second vents 186 can be disposed at a second end 176 of the cavity 124. The first vent 184 can be a handle section vent. The one or more second vents 186 can be utensil section vents. The cavity 124 can, for example, include a second vent 186 for each tine of a fork if the cavity 124 is fork-shaped.

Figure 3:
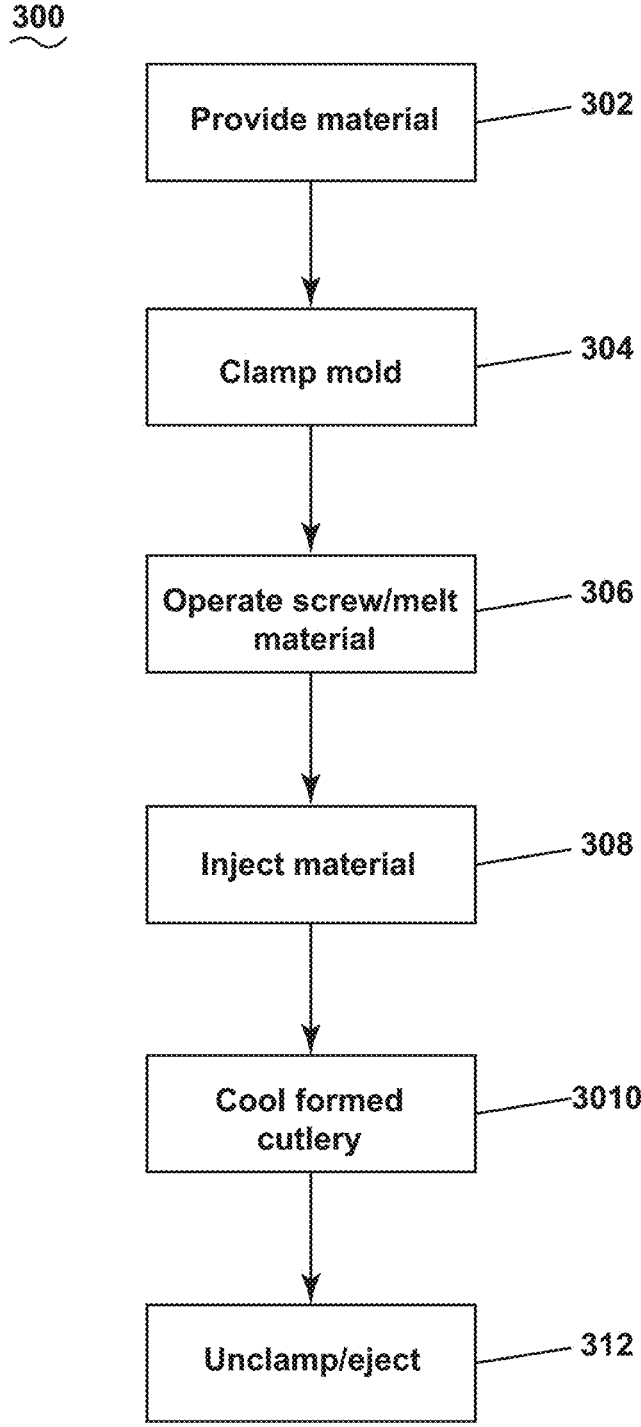
FIG. 3 is a flow diagram of an exemplary method for injection molding cutlery according to an aspect of the disclosure.

As generally illustrated in FIG. 3, an aspect of the present disclosure comprises a method 300 of injection molding plastic cutlery 200 in a mold 110 having at least two mold portions 120, 122 forming a cutlery-shaped mold cavity 124. The method 300 can comprise providing plastic material 126 (i.e., biodegradable plastic), such as in pellet form, to a hopper 130 of an injection assembly 112 (block 302). The method can further comprise applying to the mold 110 a clamping force of 3 tons per square inch or less (e.g., about 2.5 tons per square inch or less), such as via a press 114 (block 304). The clamping force can be less than 60% (e.g., less than 50%) of a clamping force required for injection at an end of the cavity 124, which may be about 4.5 tons per square inch or greater (e.g., for cutlery 200 that is about 6-8 inches long).

The method 300 can comprise operating a screw 136 of the injection assembly 112 to heat and/or pressurize the plastic material 126, which involves melting the material 126 (block 306).

The method 300 can comprise injecting the molten biodegradable plastic material 126 into a mold cavity 124, such as via operation of the screw 136 (block 308). For example and without limitation, a molten biodegradable plastic material 126 having a viscosity of at least 100 Pa·s at a shear rate of 1000 1/s and a temperature of 180 degrees Celsius can be injected into a center section 170 of a cutlery-shaped mold cavity 124 at an injection pressure of 8,000 PSI or less per cavity. In some configurations, injecting of the molten biodegradable plastic 126 is ceased after 2 seconds or less. The injecting of the molten biodegradable plastic 126 can fill the cutlery-shaped mold cavity 124. Injecting of the molten biodegradable plastic 126 may be conducted via the screw actuator 138 actuating the screw 136 to push the molten biodegradable plastic 126 through the nozzle 134, through internal passages 142 and nozzles 144, 146 of the manifold 144, and through the gates 164 into the cavities 124.

The clamping force of block 302 may be applied prior to and/or at the start of the injecting, and may continue to be applied during injecting. The method can comprise (e.g., during the injecting in block 308), venting air from the handle section 180 via a handle section vent 184 and from the utensil section 182 via a utensil section vent 186.

The method 300 can comprise cooling the material 126, such as via active or passive cooling (block 310). The method 300 can comprise unclamping the mold portions 120, 122 and ejecting the formed cutlery 200 from the cavity 124 (block 312).

Figures 4, 5, 6:
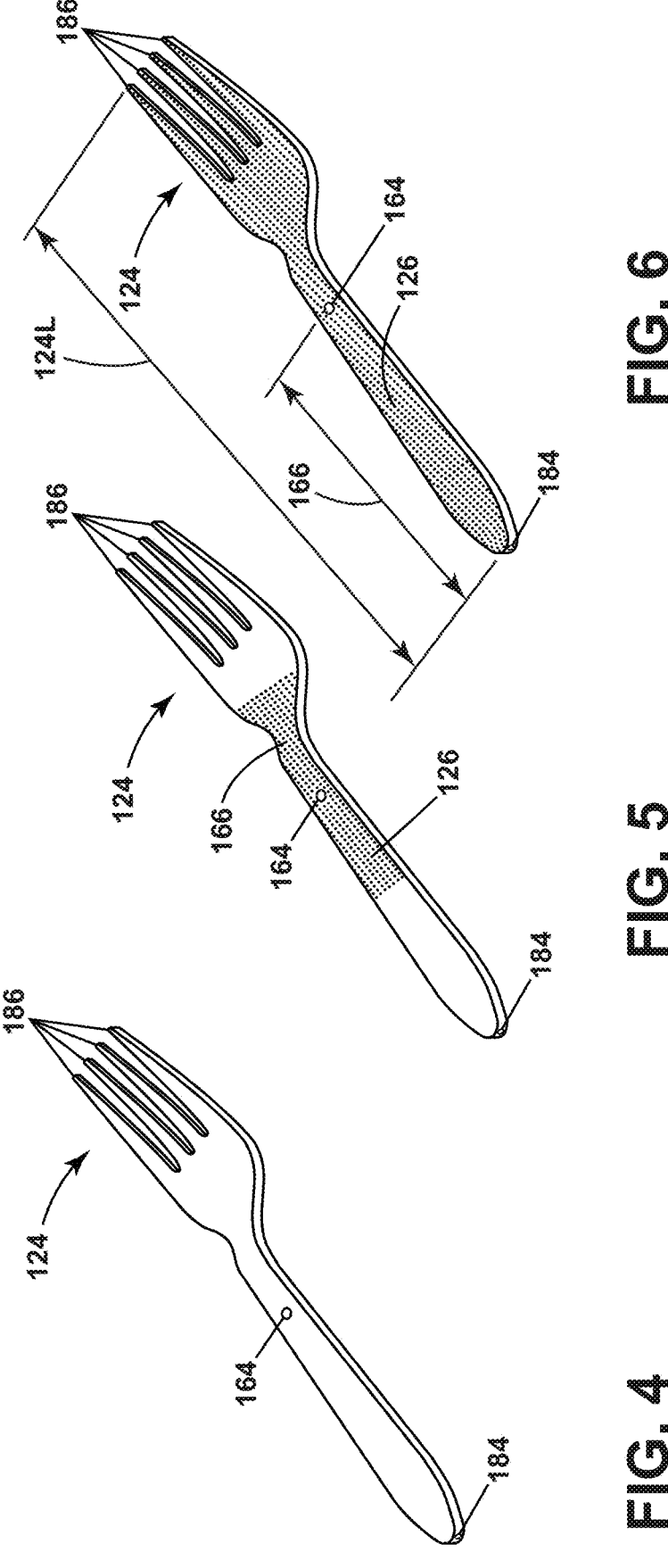
FIGS. 4-6 are perspective views of an exemplary mold cavity prior to injection, during injection, and after injection, respectively, according to an aspect of the disclosure.

Compared with other designs, injecting material 126 into a cavity 124 according to aspects of the current disclosure (block 308) can utilize reduced injection pressures can result from injected material 126 flowing into the cavity 124 through the gate 164 and toward both ends 174, 176 of the cavity 124, such as generally illustrated in FIGS. 4-6. FIG. 4 shows a cavity 124 prior to injection. FIG. 5 shows the cavity 124 during injection, with injected material 126 flowing from the gate 164 in the center section 170 toward the first end 174 and toward the second end 176 (e.g., simultaneously in opposite directions). FIG. 6 shows the cavity 124 after injection is complete or substantially complete, with injected material 126 having flowed from the center section 170 to both ends 174, 176.

Aspects of the present disclosure can involve injecting material 126 in a center section 170 instead of injecting at one end and requiring the injected material 126 to flow substantially the entire length 124L of the cavity 124, as is done with some other designs. For example, the length of a flow path 166 of some or all injected material 126 can be 60% or less of the length 124L of the cavity 124, and can be 55% or less, and/or about 50% of the length 124L. In some configurations the length 124L can be at least 6 inches, at least 7 inches, and/or in a range of about 6 inches to about 7.75 inches. For example, a range of 5.5 inches to 8.0 is contemplated. Reduced flow path lengths can reduce cooling of the material 126 during injection, which can reduce injection pressure. For example, with longer flow paths, the material 126 reaches lower temperatures, which increases viscosity and can require increased fill times or increased injection pressures to maintain fill times.

Some other designs, with injection at an end of a cavity, were developed from cold runner applications and applied to thermal gate and valve gate technology. Since those designs have been used with non-biodegradable materials having lower viscosities (e.g., polyethylene, polystyrene), high injection pressures have not been needed, so high clamping pressures associated with high injection pressures have also not been an issue.

Figure 7:
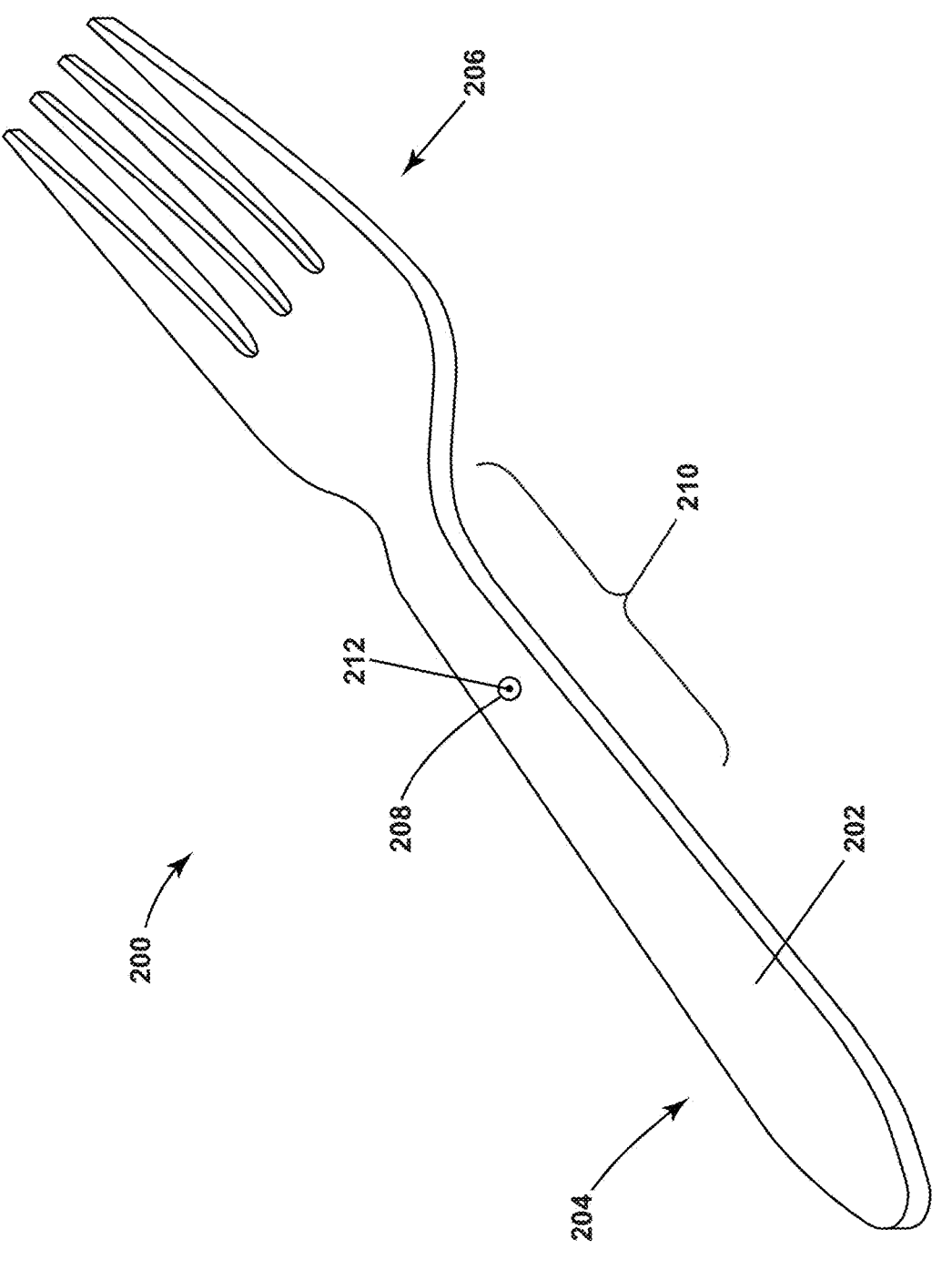
FIGS. 7 and 8 are perspective views of injection molded cutlery according to an aspect of the disclosure.
Figure 8:
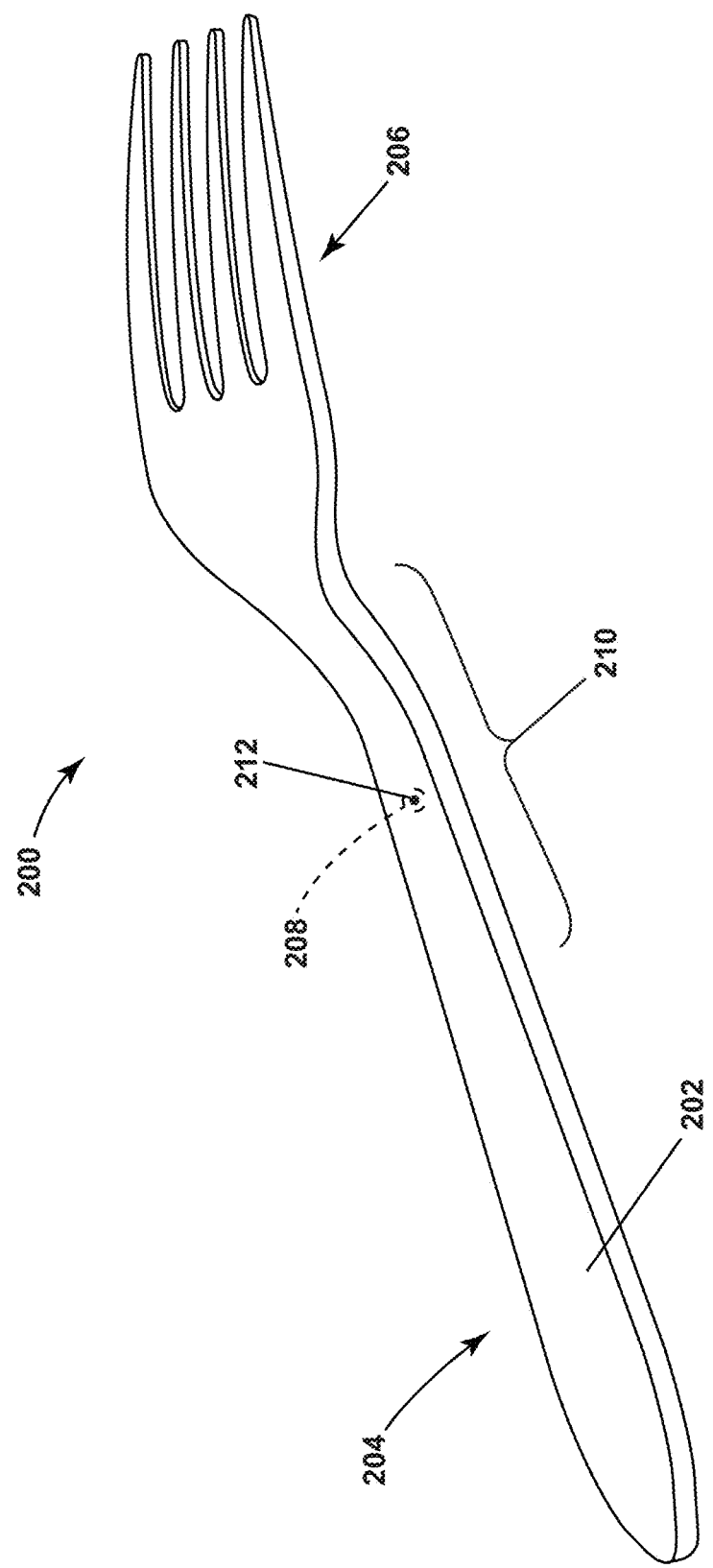
Figure 9:
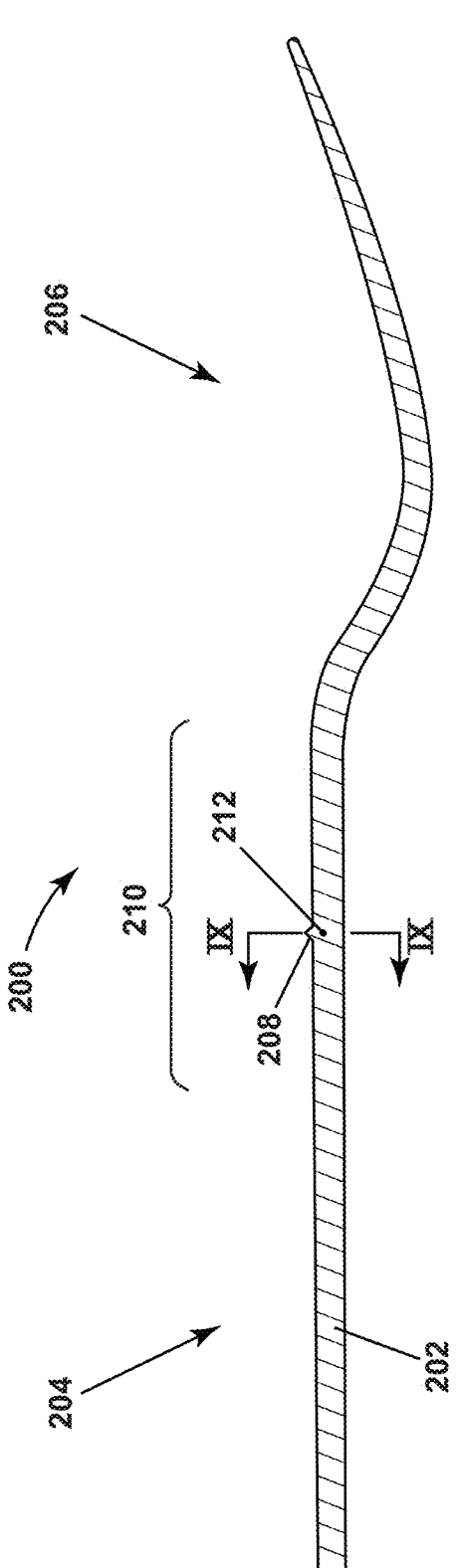
FIGS. 9 and 10 are cross-sectional views of injection molded cutlery according to an aspect of the disclosure.
Figure 10:
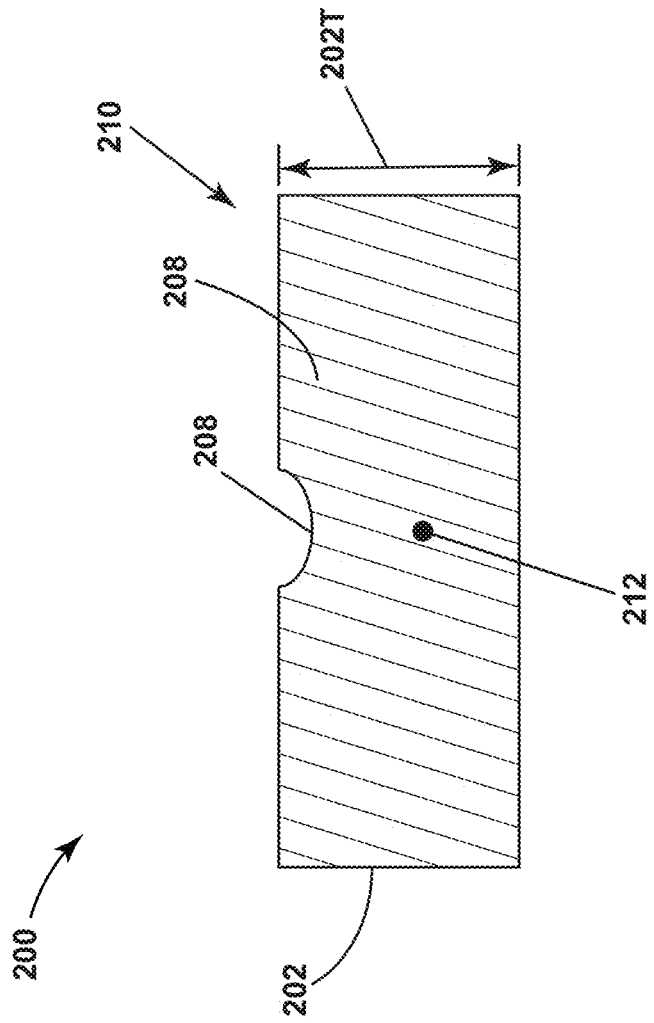

According to an aspect of the present disclosure, and as generally illustrated in FIGS. 7-9, injection molded cutlery 200, such as formed via one or more aspects of the system 100 and/or the method 300, can include a body 202 defining a handle portion 204 and a utensil portion 206, and having an injection gate mark 208 located at a center section 210 of the body 202. The center section 210 of the cutlery 200 can correspond to the center section 170 of the cavity 124. For example, the center section 210 can include 20% of the total volume of the cutlery 200 and can include and/or be centered at the volumetric center 212 of the cutlery 200. The center section 210 may include parts of either or both of the handle portion 204 and the utensil portion 206. According to an aspect of the present disclosure, the body 202 can be made from a bio-material 126 injected at a pressure that is less than 60% of an injection pressure required for injection at an end of the body 202. For example, to fill a particular cavity 124 in a specific time frame, such as in 2 seconds or less, injection according to aspects of the present disclosure that inject at a center section 170 can utilize injection pressures that are less than 60% of injection pressures that would be required to fill the same cavity 124 in the same time frame by injecting at the end of the cavity 124.

In one aspect of the present disclosure, such as generally illustrated in FIGS. 7-9, the cutlery 200 includes an injection gate mark 208 that is located in the center section 210. The injection gate mark 208 can be formed via the gate 164 during injection molding of the cutlery 200 (block 308). The injection gate mark 208 can include a protrusion that extends, at least to some degree, from the body 202, some form of deformation/indentation, and/or other visible indication on the body 202 of the position of the gate 164 during injecting. The injection gate mark 208 can be located at a first side (e.g., a top side) or a second side (e.g., a bottom side) of the cutlery 200, but can be located in other locations depending on the position of the gate 164 relative to the cavity 124. With some configurations, the center section 210 includes a section of the handle portion 204 and the injection gate mark 208 can be disposed in that section of the handle portion 204.

According to an aspect of the present disclosure, a body 202 of cutlery 200 can be made via injection molding with a bio-material or biodegradable plastic, such as Polyhydroxyalkanoate (PHA). Additionally or alternatively, the bio-material or biodegradable material comprises cellulose acetate and/or a bio-resin based material. The viscosity of the bio-material or biodegradable plastic can, for example and without limitation, be at least 100 Pa·s at a shear rate of 1000 1/s and a temperature of 180 degrees Celsius. Non-biodegradable materials (e.g., polypropylene), may include significantly lower viscosities, such as 60 Pa·s at a shear rate of 1000 1/s and a temperature of 240 degrees. This higher viscosity of bio-materials can result in using injection pressures that are nearly double when injecting at the end of a cavity. The increased injection pressures also increase clamping force and/or reduce the number of cavities per mold. Embodiments of the present disclosure can reduce or eliminate the effects of these increased injection pressures, increased fill times, increased clamping forces, and/or cavity reduction. For example, embodiments of the present disclosure may be 50-100% more efficient than if bio-material is injected at the end of a cavity.

According to an aspect of the present disclosure, injection molded cutlery 200 is biodegradable and/or compostable, such as in a composting facility and/or for home/backyard composting. In some instances, the cutlery 200 can be sufficiently biodegradable and/or compostable to comply with one or more standards or certification requirements, such as ASTM D6400 (e.g., ASTM D6400-22), ASTM D6868, European Standard EN 13432 (e.g., BS EN 13432: 2000), European Standard 14995, International Biodegradable Products Institute (BPI) BPI Commercial Compostability Certification Scheme (e.g., version 2.4), and/or TÜV AUSTRIA "OK compost HOME". For example, cutlery 200 may be formed to reach or exceed 90% disintegration in a particular timeframe and/or environment, such as in a municipal, commercial, and/or industrial composting facility (e.g., 55-60 degrees Celsius) within 12 weeks, or in a home/backyard composting environment (e.g., 20-30 degrees Celsius) within 6 months or 180 days. Additionally or alternatively, cutlery 200 may be formed to reach 90% biodegradation (e.g., conversion of the carbon in the cutlery 200 to carbon dioxide) in a particular timeframe and/or environment, such as in a municipal, commercial, and/or industrial composting facility (e.g., 55-60 degrees Celsius) within 6 months or 180 days, or in a home/backyard composting environment (e.g., 20-30 degrees Celsius) within 12 months or 365 days. Municipal, commercial, and/or industrial composting facilities may provide environments with higher temperatures than home/backyard environments, so testing for standards/requirements for municipal, commercial, and/or industrial compostability may be conducted at higher temperatures (e.g., 55-60 degrees Celsius) than for home compostability (e.g., 20-30 degrees Celsius).

According to one aspect of the present disclosure, cutlery 200 may be designed and/or formed to promote compostability. For example, cutlery 200 may include certain maximum cross-sectional areas and/or maximum thicknesses (e.g., wall thicknesses). In at least one exemplary aspect, the body 202 includes a volume to surface area ratio of 0.0242 or less, and a maximum thickness 202T of 0.0508 inches or less. A total surface area of a body 202 can, for example and without limitation, be about 10 in² to about 12.5 in². In some examples, the volume to surface area ratio can be 0.022 or less. Small volume to surface area ratios compatible with being compostable can also increase injection pressures or fill times, so configurations that can otherwise reduce injection pressure, such as utilizing gates 164 in center section 170, can be particularly advantageous for compostable cutlery.

In at least one exemplary aspect, the body 202 and/or the handle portion 204 of the cutlery 200 includes a minimum thickness 202T of 0.0450 inches, such as to provide at least a minimum amount of strength to the body 202 for use as cutlery.

Figure 11:
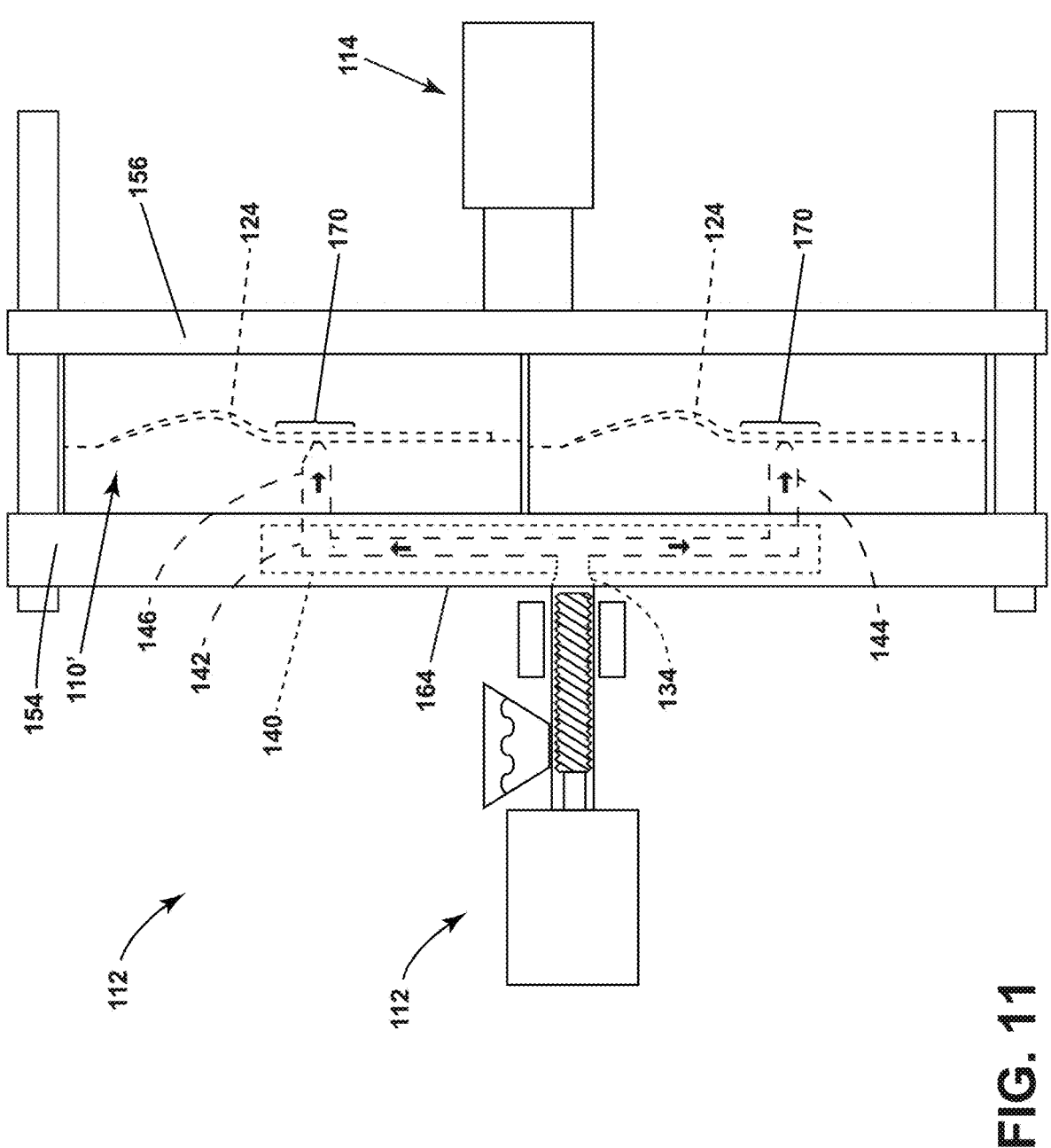
FIG. 11 is a schematic view of an exemplary system for injection molding cutlery according to an aspect of the disclosure.

Referring to FIG. 11, according to an aspect of the present disclosure, a system 100 can include a plurality of molds 110, 110' coupled to the same press 114. For example, the press 114 can include platens 154, 156 that is each coupled to respective portions 120, 122 of a first mold 110 and a second mold 110', but may be coupled to more than two molds. The second mold 110' may or may not include the same configuration as the first mold 110. For example, the second mold 110' can include one or a plurality of cutlery-shaped cavities 124. In some instances, a larger mold 110 can be utilized instead of multiple molds 110, 110'. With some configurations, an injection assembly 112 is connected to each mold 110, 110'. In other configurations, one injection assembly 112 can be connected to two or more molds 110, 110', such as via connecting a common manifold 140 to each mold 110, 110'.

While examples of various temperatures, pressures, and viscosities are provided herein for one example of a bio-material, PHA, for description purposes only, the instant disclosure is not limited to those values. Temperatures, pressures, and viscosities can be functions of the particular material(s) being used, and can vary between materials and versions of materials. For example, different variations of PHA can have different viscosities and can be utilized with different temperatures and pressures than those expressly listed herein.

The following clauses define additional aspects of the present disclosure which are encompassed herein. These aspects can be combined as desired to form combinations that are encompassed by the present disclosure.

1. A piece of injection molded cutlery having a body defining a handle portion and a utensil portion, with an injection gate mark located at a center section of the body, and the body is made from a bio-material injected at a pressure that is less than 60% of an injection pressure required for injection at an end of the body.

2. The piece of injection molded cutlery of clause 1 wherein the center section comprises 20% of a total volume of the body and includes a volumetric center of the body.

3. The piece of injection molded cutlery according to any preceding clause wherein the body has a volume to surface area to volume ratio of 0.0242 or less.

4. The piece of injection molded cutlery according to any preceding clause wherein the body has a thickness of 0.0450 inches to 0.0508.

5. The piece of injection molded cutlery according to any preceding clause wherein the bio-material comprises Polyhydroxyalkanoate (PHA).

6. The piece of injection molded cutlery according to any preceding clause wherein the center section includes a section of the handle portion; and wherein the injection gate mark is located in the section of the handle portion.

7. The piece of injection molded cutlery according to any preceding clause wherein the body is compostable.

8. The piece of injection molded cutlery according to any preceding clause wherein the body is biodegradable by at least 90% within twelve months in an environment having a temperature range of 20 to 30 degrees Celsius.

9. The piece of injection molded cutlery according to any preceding clause wherein the body is formed with a clamping pressure of 3 tons per square inch or less and the body is at least 5.5 inches long.

10. A method of injection molding plastic cutlery in a mold having at least two mold portions forming a cutlery-shaped mold cavity, the method comprising injecting a molten biodegradable into a center section of the cutlery-shaped mold cavity at an injection pressure that is less than 60% of an injection pressure required for injection at an end of the cutlery-shaped mold cavity.

11. The method according to any preceding clause wherein injecting of the molten biodegradable plastic is ceased after 2 seconds or less.

12. The method according to any preceding clause wherein the injecting of the molten biodegradable plastic fills the cutlery-shaped mold cavity and forms an injection gate mark in the center section.

13. The method according to any preceding clause further comprising applying to the mold a clamping force that is less than 60% of a clamping force required for injection at the end of the cutlery-shaped mold cavity.

14. The method according to any preceding clause wherein the two mold portions form a plurality of additional cutlery-shaped mold cavities.

15. The method according to any preceding clause wherein the plastic cutlery includes a handle portion and a utensil portion;

wherein the mold cavity comprises (i) a handle section for forming the handle portion, and (ii) a utensil section for forming the utensil portion; and wherein the method comprises, during the injecting, venting air from the utensil section via a utensil section vent and from the handle portion via a handle section vent.

16. A system for forming compostable injection molded cutlery from a bio-material, the system comprising: a mold including a plurality of cutlery-shaped mold cavities each having a center section corresponding to the center section of a body of the cutlery; a plurality of gates in fluid communication with the center sections of the plurality of mold cavities; an injector assembly coupled to the mold to provide the bio-material to the plurality of mold cavities via the plurality of gates; and a press operably coupled with the mold.

17. The system of clause 16 wherein the bio-material has a viscosity of at least 100 Pa·s at a shear rate of 1000 1/s and a temperature of 240 degrees Celsius.

18. The system of clause 16 wherein the plurality of mold cavities includes a first set of mold cavities and a second set of mold cavities; wherein the first set of mold cavities are parallel with each other; and wherein the second set of mold cavities are antiparallel with the first set of mold cavities.

19. The system of clause 18 wherein a total number of mold cavities of the plurality of mold cavities is at least 48, a clamping force provided by the clamp assembly for injection is 2.5 tons per square inch or less, the body is at least 5.5 inches long, an injection pressure provided by the injector assembly is 8,000 PSI per cavity or less, and a fill time is 2 seconds or less.

20. The system of clause 16 wherein the plurality of gates are disposed such that a maximum length of a flow path of the bio-material during injection is 55% or less of a length of a mold cavity of the plurality of mold cavities.

To the extent not already described, the different features and structures of the various aspects of the present disclosure may be used in combination with each other as desired. For example, one or more of the features illustrated and/or described with respect to one of the aspects of the present disclosure can be used with or combined with one or more features illustrated and/or described with respect to the other aspects. That one feature may not be illustrated in all aspects of the present disclosure is not meant to be construed that it cannot be, but is done for brevity of description. Thus, the various features of the different aspects may be mixed and matched as desired to form new aspects, whether or not the new aspects are expressly described.

While aspects of the present disclosure have been specifically described in connection with certain specific aspects thereof, it is to be understood that this is by way of illustration and not of limitation. Reasonable variation and modification are possible within the scope of the forgoing disclosure and drawings without departing from the spirit of the present disclosure which is defined in the appended claims.

What is claimed is:

1. A method of injection molding plastic cutlery in a mold having at least two mold portions forming a cutlery-shaped mold cavity, the method comprising injecting a molten biodegradable plastic into a center section of the cutlery-shaped mold cavity at an injection pressure that is less than 60% of an injection pressure required for injection at an end of the cutlery-shaped mold cavity.

2. The method of claim 1 wherein injecting of the molten biodegradable plastic is ceased after 2 seconds or less.

3. The method of claim 2 wherein the injecting of the molten biodegradable plastic fills the cutlery-shaped mold cavity and forms an injection gate mark in the center section.

4. The method of claim 3 further comprising applying to the mold a clamping force that is less than 60% of a clamping force required for injection at the end of the cutlery-shaped mold cavity.

5. The method of claim 1 wherein the two mold portions form a plurality of additional cutlery-shaped mold cavities.

6. The method of claim 1 wherein the plastic cutlery includes a handle portion and a utensil portion;

wherein the mold cavity comprises (i) a handle section for forming the handle portion, and (ii) a utensil section for forming the utensil portion; and wherein the method comprises, during the injecting, venting air from the utensil section via a utensil section vent and from the handle portion via a handle section vent.

7. A system for forming compostable injection molded cutlery from a bio-material, the system comprising:

a mold including a plurality of cutlery-shaped mold cavities each having a center section corresponding to the center section of a body of the cutlery;

a plurality of gates in fluid communication with the center sections of the plurality of mold cavities;

an injector assembly coupled to the mold to provide the bio-material to the plurality of mold cavities via the plurality of gates; and a press operably coupled with the mold.

8. The system of claim 7 wherein the bio-material has a viscosity of at least 100 Pa·s at a shear rate of 1000 1/s and a temperature of 240 degrees Celsius.

9. The system of claim 7 wherein the plurality of mold cavities includes a first set of mold cavities and a second set of mold cavities;

wherein the first set of mold cavities are parallel with each other; and wherein the second set of mold cavities are antiparallel with the first set of mold cavities.

10. The system of claim 9 wherein a total number of mold cavities of the plurality of mold cavities is at least 48, a clamping force provided by the clamp assembly for injection is 2.5 tons per square inch or less, the body is at least 5.5 inches long, an injection pressure provided by the injector assembly is 8,000 PSI per cavity or less, and a fill time is 2 seconds or less.

11. The system of claim 7 wherein the plurality of gates are disposed such that a maximum length of a flow path of the bio-material during injection is 55% or less of a length of a mold cavity of the plurality of mold cavities.

* * * * *